United States Patent
Shimotoyodome et al.

(10) Patent No.: US 6,478,206 B2
(45) Date of Patent: *Nov. 12, 2002

(54) SCRIBING METHOD

(75) Inventors: Gyo Shimotoyodome, Tokyo-to (JP); Hirokazu Ishikawa, Tokyo-to (JP); Takeki Shirai, Tokyo-to (JP)

(73) Assignees: THK Co., Ltd., Tokyo-to (JP); Beldex Corporation, Tokyo-to (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/544,299

(22) Filed: Apr. 6, 2000

(65) Prior Publication Data

US 2002/0050504 A1 May 2, 2002

(30) Foreign Application Priority Data

Apr. 6, 1999 (JP) .................................. 11-098395

(51) Int. Cl.$^7$ .............................................. B65H 35/10
(52) U.S. Cl. ............................. 225/2; 225/96; 83/879; 83/880
(58) Field of Search .................. 83/879, 956, 875, 83/880, 701, 13; 225/2, 96; 30/164.9

(56) References Cited

U.S. PATENT DOCUMENTS

| | | | | |
|---|---|---|---|---|
| 1,373,635 A | * | 4/1921 | Rammelsberg | 33/18 |
| 3,122,953 A | | 3/1964 | Atkeson | |
| 3,230,625 A | * | 1/1966 | Meyer | 33/32 |
| 3,567,086 A | * | 3/1971 | Wark | 225/2 |
| 3,680,213 A | * | 8/1972 | Reichert | 33/18 |
| 4,095,344 A | * | 6/1978 | Loomis | 33/18 |
| 4,567,797 A | * | 2/1986 | Folk | 83/56 |
| 5,100,270 A | * | 3/1992 | Dowdle et al. | 409/132 |
| 5,318,420 A | * | 6/1994 | Blaimschein | 425/174.2 |
| 5,355,755 A | * | 10/1994 | Sakata et al. | 83/875 |
| 5,820,006 A | * | 10/1998 | Turner | 225/96 |
| 6,058,823 A | * | 5/2000 | Michoud | 83/508.3 |

FOREIGN PATENT DOCUMENTS

EP 0 905 097 A 3/1999

* cited by examiner

*Primary Examiner*—Kenneth E. Peterson
*Assistant Examiner*—Omar Flores-Sańchez
(74) *Attorney, Agent, or Firm*—Armstrong, Westerman & Hattori, LLP (57) ABSTRACT

A method of forming a scribe line on a work surface is carried out by a scribing apparatus comprising a scribe body including an abutment member, such as cutter provided with an penetrator, having at least first and second ridgelines and a sharp tip end portion and a vibration generating member for periodically applying vibrations to the abutment member. A vibration is applied to the abutment member with the tip end portion thereof abutting against the work surface, and the scribe body is relatively moved along the work surface to thereby form a scribe line on the work surface. In this scribing method, a first angle constituted by the first ridgeline of the abutment member and the work surface and a second angle constituted by the second ridgeline thereof and the work surface are made different from each other and the first and second ridgelines are opposed in the moving direction of the scribe body.

5 Claims, 6 Drawing Sheets

SCRIBING METHOD

BACKGROUND OF THE INVENTION

The present invention relates to a scribing method for forming a scribe line on a surface of a work (workpiece) made of a hard brittle material such as plate glass, ceramics plate or like.

In an known art, the Japanese Patent Laid-open Publication No. HEI 9-25134 discloses an apparatus for forming a scribe line on the work surface while applying vibrations to a work (workpiece) formed of a hard brittle material such as plate glass or ceramics plate. In such scribing apparatus, an outer cylinder of an air-cylinder assembly is fixed to a support member and an inner cylinder thereof is connected to one end of a vibration generation member. The vibration generation member has another one end to which a cutter holder is connected, and the cutter holder, to which a cutter is secured, is mounted to the support member to be slidable through a slide mechanism. When the cutter holder is urged by the air-cylinder assembly, the cutter held by the cutter holder is pressed against a surface of the work, and then, a high frequency voltage is applied to the vibration generation member to thereby expand or contract. According to the expansion/contraction motion (retractable motion) of the vibration generation member, the cutter is vibrated, and under this state, the support member is moved along the work surface to thereby form the scribe line on the work surface.

Incidentally, in a scribing method performed by using the scribing apparatus mentioned above, the cutter is pressed against the work surface every time of respective vibration periods of the cutter, and according to such pressing force, the work surface is plastically deformed and fine recesses are hence formed thereon. Cracks will be formed from such recesses in a work thickness direction. When the recesses are formed to be continuous, the cracks are also formed to be continuous, thereby forming a scribe line.

However, in a prior art, analysis or research of a shape or size of the tip portion of the cutter has not sufficiently been made, and a cutter having merely a sharp tip end portion has been utilized. For this reason, the cracks are formed so as to extend from the recesses not only in a direction of a scribe line but also in a direction crossing the scribe line, and therefore, vibration energy could not concentrically utilized for effectively forming the cracks along the scribe line. That is, the effective deep cracks along the scribe line could not be formed, and accordingly, it is impossible to satisfy the requirement of easily breaking the work along the scribe line.

SUMMARY OF THE INVENTION

An object of the present invention is to substantially eliminate defects or drawbacks encountered in the prior art mentioned above and to provide a scribing method for forming a scribe line on a surface of a hard brittle work (workpiece) capable of forming effective cracks along a scribe line and easily breaking the work along the scribe line.

This and other objects can be achieved according to the present invention by providing a scribing method of forming a scribe line on a work surface comprising the steps of preparing a scribing apparatus provided with a scribe body including an abutment member having at least first and second ridgelines and a sharp tip end portion and a vibration generating member for periodically applying vibrations to the abutment member, applying a vibration to the abutment member to vibrate the abutment member with the tip end portion thereof abutting against the work surface and relatively moving the scribe body along the work surface to thereby form a scribe line on the work surface, wherein a first angle constituted by the first ridgeline of the abutment member and the work surface and a second angle constituted by the second ridgeline thereof and the work surface are different from each other and the first and second ridgelines are opposed in the moving direction of the scribe body.

In preferred embodiments, the first angle is made larger than the second angle, and the second ridgeline is directed to the relatively moving direction of the scribe body and the first ridgeline is directed to a direction opposed to the moving direction of the second ridgeline.

The abutment member is pressed against the work surface by the periodical vibrations of the vibration generation member so as to form a plurality of plastically deformed portions to the work surface by the abutment member which is pressed against the work surface with a space from each other and cracks are formed from the plastically deformed portions at portions corresponding to the first and second ridgelines so as to extend in the moving direction of the scribe body, the cracks being connected to each other to thereby form a scribe line. In this example, when a moving speed of the scribe body is denoted as V(mm/sec) and a vibration frequency is denoted as F(number/sec), a feed amount S of the abutment member per one period of vibration is expressed by an equation of:

$$S(\mu m)=(V/F)\times 1000.$$

When a length of the deformed portion in the moving direction is denoted as L($\mu$m), a total length of the cracks is denoted as $\Delta$L, a feed amount S of the abutment member is expressed by L<S$\leq$L+$\Delta$L, in which the lengths L and $\Delta$L are determined by a pressing force of the abutment member, a vibration load and a shape of the abutment member.

In an embodiment in which the first and second ridgelines have equal angles to each other with respect to a central axis of the tip end portion of the abutment member, and the first and second angles of the first and second ridgelines to the work surface may be made different by inclining the central axis of the tip end portion towards the moving direction of the scribe body. The first and second angles have a difference in angles in a range of 1° to 10°.

According to the preferred embodiment of the present invention mentioned above, deep cracks can be formed along a line to be scribed by opposing the first and second ridgelines of the abutment member such as diamond penetrator having angles different from each other with respect to the work surface and by making coincident the extending direction of the cracks with the feed (moving) direction of the scribe body.

Furthermore, the cracks can be formed more precisely along the feed direction and can be more fine, by making the first angle constituted by the first ridgeline larger than the second angle constituted by the second ridgeline, and by making the second ridgeline to be directed to the moving direction and the first ridgeline to be directed to a direction opposed to the moving direction.

The scribe line can be more precisely formed by connecting the cracks extending from the respective plastically deformed portions, i.e. recesses, formed to the work surface with space in the feed direction.

Furthermore, there is usable an abutment member having tip end portions which are easily manufactured.

Furthermore, the cracks stably extend by making the first and second angles to have a difference in angles in a range of 1° to 10°.

The nature and further characteristic features of the present invention will be made further clear from the following descriptions made with reference to the accompanying drawings.

DESCRIPTION OF THE PREFERRED EMBODIMENTS

Figure 1:
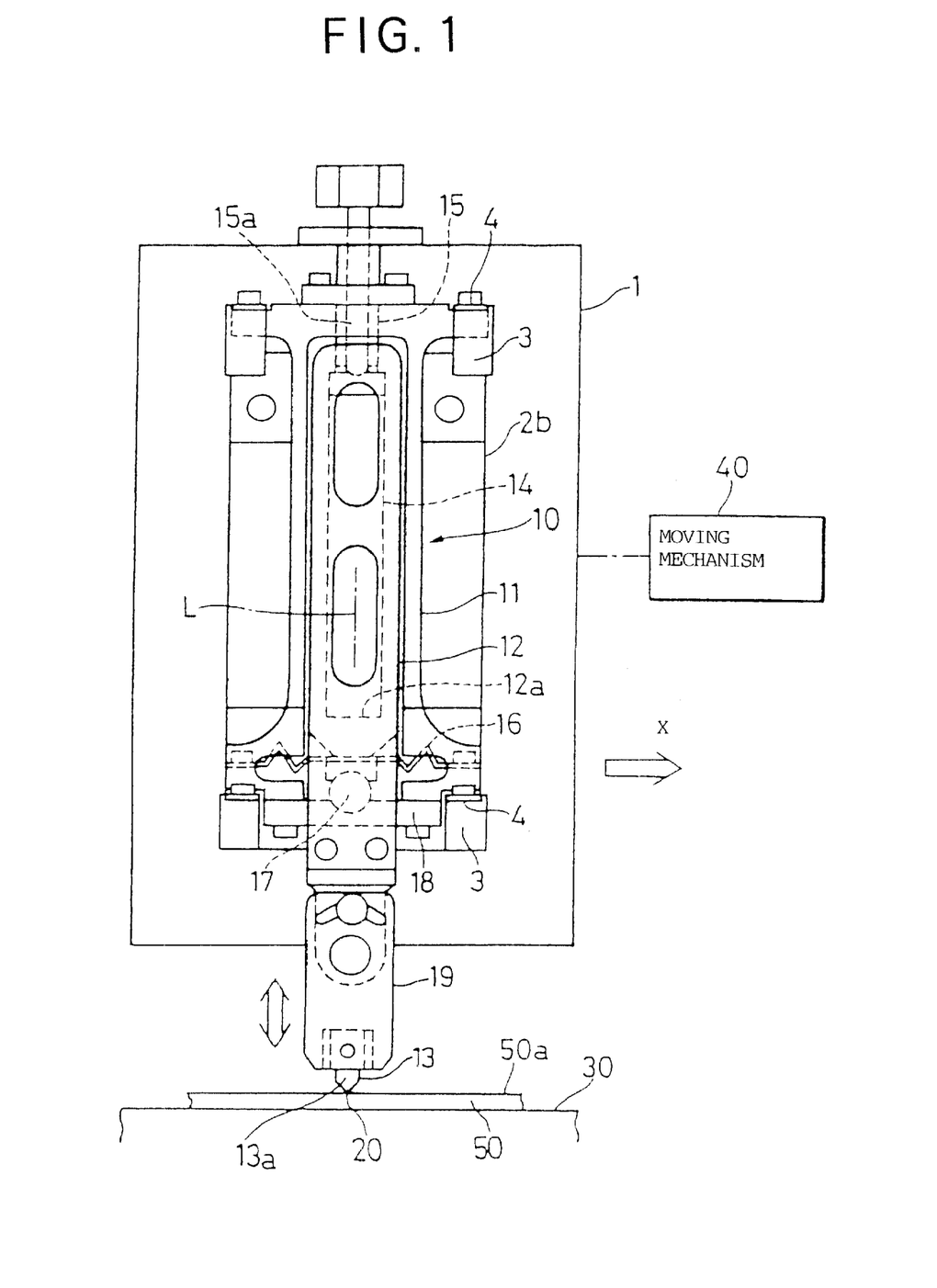
FIG. 1 is a schematic front view showing an entire structure of a scribing apparatus for carrying out one embodiment of the present invention.
Figure 2:
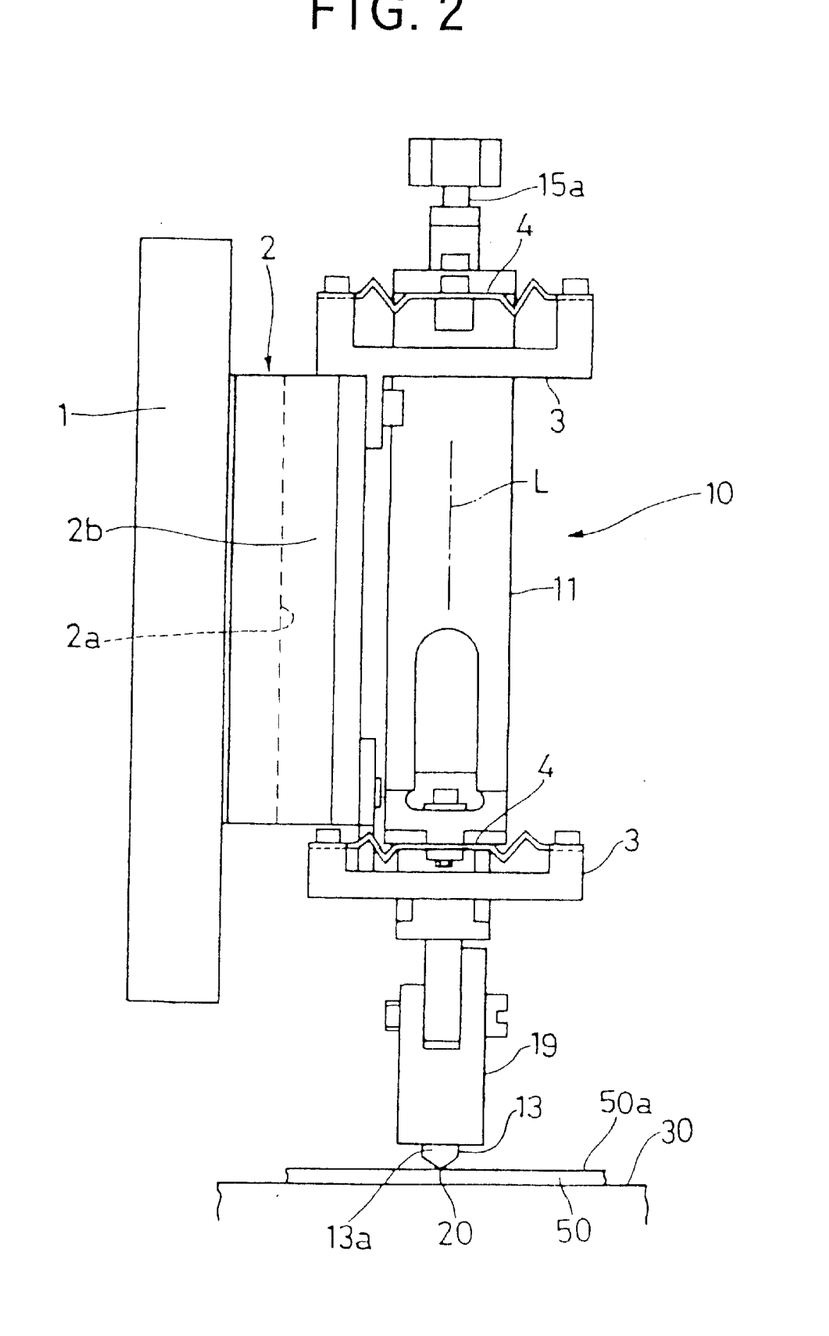
FIG. 2 is a side view of the scribing apparatus of FIG. 1.

FIGS. 1 and 2 show a scribing apparatus for carrying out a scribing method according to the present invention. Further, it is to be noted that terms indicating directions, positions or like used herein such as "vertical", "right", "upper" and the like are used in an illustrated state or actually usable attitude.

With reference to FIGS. 1 and 2, the scribe apparatus comprises a support plate (support base) 1 arranged vertically and a scribe body 10 supported by the support plate 1 through a slide mechanism 2 to be slidable in a vertical direction.

The slide mechanism 2 comprises a guide 2a fixed to the support plate 1 so as to extend vertically and a slider 2b supported by the guide 2a to be slidable in the vertical direction. Four plate springs 4 are attached to the slider 2b through upper and lower brackets 3, respectively, and the scribe body 10 has a body portion 11 which is supported by the plate springs 4.

The scribe body 10 comprises the body portion 11 having a vertically elongated box-shaped structure, a holder 12 also having a vertically elongated box-shaped structure so as to be accommodated in the body portion 11 and to be minutely slidable in the vertical direction, a cutter (head or abutment member) attached to the lower end (front end) of the holder 12 and a vibration generation member 14 accommodated in the holder 12 and having a vertically extending structure. The vibration generation member 14 comprises a piezo-actuator(s) or the like for generating and applying vibrations in the vertical (axial) direction to the holder 12.

The vibration generation member 14 has a central axis common to axes of the body portion 11 and the holder 12, the central axis (line) being shown as L in FIG. 1, for example, and the vibration is applied along to this axial line L. The vibration generation member 14 has a lower end abutting against a bottom surface 12a (abutment surface) of an inner space of the holder 12. The holder 12 also has an upper end supported by a guide member 15 provided for the upper end of the body portion 11 to be minutely slidable in the direction along the central axis L, i.e. vibrating direction.

The lower end of the holder 12 is supported by a plate spring 16 stretched to the body portion 11 and a spherical ball 17 (as a preload applying member) formed of an elastic material such as rubber or resin, and the ball 17 is disposed between a receiver plate 18 fixed to the body portion 11 and the holder 12. The ball 17 acts to urge upward the holder 12 by its elastic restoring force so as to apply the preload (a force in a direction to axially compress the vibration generation member 14) to the vibration generation member 14 between the bottom surface 12a of the inner space of the holder 12 and an adjusting screw 15a screwed to the guide member 15.

The holder 12 has a pair of lower extensions in shape of fork extending so as to straddle the plate spring 16 and the cutter 13 is mounted to the paired extensions of the holder 12 through an attachment which is adjustable in a mounting angle with respect to the holder 12. The cutter 13 is mounted to a position substantially on the central axis line L of the body portion 11 and the vibration generation member 14. The cutter 13 comprises a base portion 13a having a conical shape having a fine tip end extending downward and an penetrator (indenter) 20 formed from diamond secured to the lower end portion of the base portion 13a. The diamond penetrator 20 has substantially a quadrangular pyramid shape and constitutes a cutter tip portion.

The scribing apparatus further comprises a table 30 for horizontally supporting the work 50 and a moving (or driving) mechanism 40 for horizontally moving the support plate 1 and, hence, moving the scribe body 10 in the horizontal direction through the slide mechanism 2 and the plate springs 4.

Figure 3:
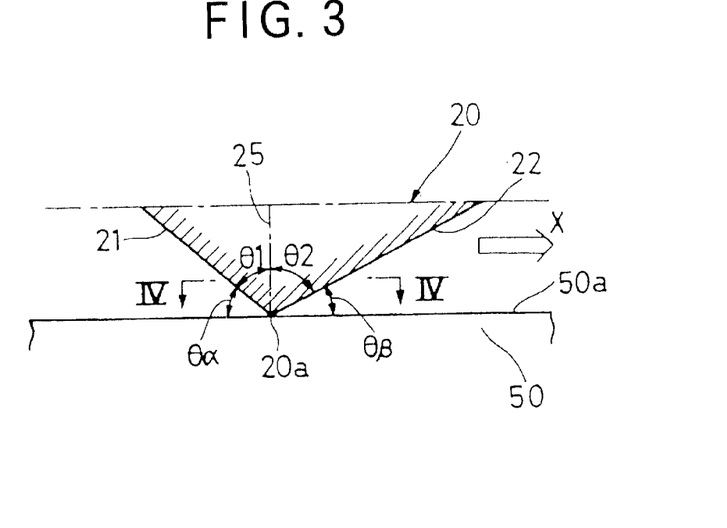
FIG. 3 is an elevational section, in an enlarged scale, of an penetrator (indenter) made from diamond provided for the tip end of a cutter used for the scribing apparatus according to a first embodiment of the present invent invention.
Figure 4:
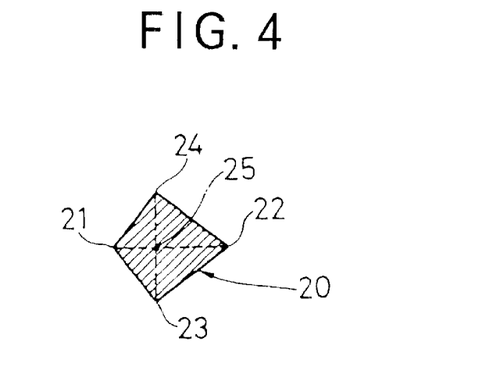
FIG. 4 is a cross sectional view of the diamond penetrator of FIG. 3 taken along the line IV—IV therein.

The characteristic features of the present invention will be further described hereunder with reference to FIGS. 3 and 4.

The diamond penetrator 20 has the quadrangular pyramid shape having an apex 20a directed downward as shown in FIG. 3 and four (first to fourth) ridgelines (edge lines) 21 to 24 extend from this apex 20a. The diamond penetrator 20 has no square bottom portion, that is, no square sectional view taken along a plane parallel to the work surface, and providing that an axial line formed by a crossing line of a plane including opposite ridgelines 21 and 22 and a plane including opposite ridgelines 23 and 24 is a central axis (line) 25, an angle θ1 constituted by this central axis 25 and the first ridgeline 21 is the smallest and an angle θ2 constituted by the central axis 25 and the second ridgeline 22 is the largest, whereas angles constituted by the central axis 25 and the third ridgeline 23 and the central axis 25 and the fourth ridgeline 24 are equal to each other and are in a range between the angles θ1 and θ2.

The central axis 25 is coaxial with or parallel to the central axis L of the body portion 11 and is perpendicular to the surface 50a of the work 50. Because of such arrangement, an angle θα constituted by the first ridgeline 21 and the work surface 50a is the largest and an angle θβ constituted by the second ridgeline 22 and the work surface 50a is the smallest. As mentioned above, since the diamond penetrator 20 has no accurate quadrangular pyramid shape, a cross sectional shape of a plane cut horizontally (a plane parallel to the work surface 50a) has also no accurate quadrangular pyramid and has a shape as shown in FIG. 4.

A scribing method performed by using the scribing apparatus of the structure mentioned above will be carried out in the following manner.

First, the work (workpiece) 50 is placed on the table 30 and set in a horizontal attitude. Under this state, the scribe body 10 is placed on the work surface 50a and, then, a high frequency voltage is applied to the vibration generation member 14. The scribe body 10 is thereafter moved along a predetermined locus such as line (in a direction of arrow X (feed or moving direction) in FIG. 1), that is, the scribe body 10 is relatively moved (fed) along the work surface 50a.

The cutter 13 is always applied with a pressing force (static pressure) for pressing the work surface 50a, and this pressing force is originated in a dead (self weight of the scribe body 10 in this embodiment. The vibration generation member 14 is periodically expanded or contracted (retractable) in the axial direction thereof when the high frequency voltage is applied thereto, and according to this periodical expansion/contraction (retractable motion) of the vibration generation member 14, the vibration of the holder 12 is transmitted to the work 50 through the cutter 13. As a result, the cutter 13 periodically presses (abuts and beats) the work surface 50a while being moved along the work surface 50a, thereby forming a scribe line thereon.

Figure 5:
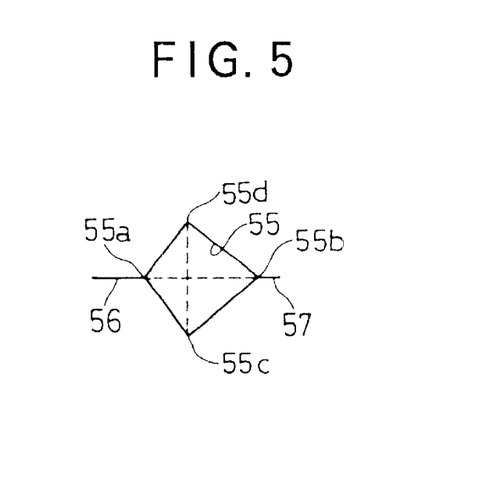
FIG. 5 is an enlarged plan view showing recess and crack formed on a surface of a work (workpiece) by being pressed by the diamond penetrator through one period of vibration of the cutter.

In more detail, in the scribe line forming process, the diamond penetrator 20 attached to the tip end of the cutter 13 presses the work surface 50a every time of the vibrations of the cutter 13, and according to this pressing of the diamond penetrator 20, a recess 55 such as shown in FIG. 5 is formed as a plastically deformed portion. This recess 55 has a rectangular shape corresponding to the horizontal cross sectional shape of the diamond penetrator 20 shown in FIG. 4 and has angled portions 55a to 55d respectively corresponding to the first to fourth ridgelines 21 to 24 of the diamond penetrator 20.

One time of pressing of the diamond penetrator 20 forms an outer layer microcrack extending from the recess 55. As mentioned above, since the angles of the ridgelines 21 to 24 with respect to the work surface 50a are different from each other, the impact stress caused to the work 50 has a directionality, and as shown in FIG. 5, it was found through experiment that the outer layer microcracks 56 and 57 mainly extend from the angled portions 55a and 55b corresponding to the ridgelines 21 and 22 of the recess 55 and that these cracks 56 and 57 extend in opposed directions and the crack 56 corresponding to the ridgeline 21 has a length longer than that of the crack 57 corresponding to the ridgeline 22.

In the present invention, the scribe line is accurately formed by utilizing specificity of the extending directions of the cracks 56 and 57 which are generated in accordance with the difference between the angles constituted by the ridgelines 21 and 22 and the work surface 50a, respectively. More in detail, when the diamond penetrator 20 is fixed to the base portion 13a of the cutter 13, the orientation of the diamond penetrator 20 is adjusted so that the ridgelines 21 and 22 are directed in the opposing manner along the feed direction X. In this manner, the cracks 56 and 57 extend in the feed direction X, as shown in FIG. 6, i.e. along the moving locus of the cutter 13.

In the described embodiment, it is also possible to surely extend the crack 56 towards the recess 55 formed just before the crack 56 which extends longer in connection with the first ridgeline 21 by directing the second ridgeline 22 towards the feed direction X and positioning the first ridgeline 21 on a position opposing to the feed direction X. This is based on the fact that an inner stress is accumulated to a portion near the recess 55 so as to guide the crack 56.

Figure 6:
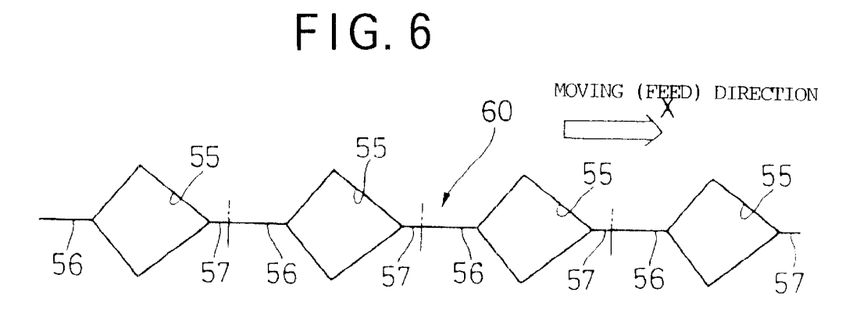
FIG. 6 is an enlarged plan view of a scribe line formed by utilizing the scribe apparatus of FIG. 1.

Furthermore, according to this embodiment, as shown in FIG. 6, a plurality of recesses 55, each formed by the pressing operation of the cutter 13 caused by one periodical vertical vibration thereof, are formed along the cutter feed direction 13 with space from each other. The scribe line 60 is formed by connecting the cracks 56 and 57 extending from the respective recesses 55. That is, in this scribe line forming method, the crack 57 extending from one recess 55 formed in the cutter feed direction in the preceding pressing process is connected to the crack 56 extending from another recess formed in the direction reverse to the cutter feed direction in the next (this time) pressing process. According to the method of the present invention, by repeating such processes, the scribe line is formed.

Conditions for forming such scribe line 60 according to the scribing method of the present invention will be described hereunder.

When the feed speed of the cutter is denoted as V(mm/sec) and the vibration frequency is denoted as F(number/sec), a feed amount S of the cutter 13 per one period of vibration is expressed by the following equation.

$$S(\mu m) = (V/F) \times 1000$$

Further, when the length of the recess 55 in the feed direction is L($\mu$m), the total length of the cracks 56 and 57 is $\Delta$L, the feed amount S for forming the scribe line 60 will be expressed by the following equation.

$$L < S \leq L + \Delta L$$

in which the lengths L and $\Delta$L are determined by the static pressure of the cutter 13, vibration load and shape of the diamond penetrator 20.

Furthermore, in the scribe line forming method mentioned above, cracks are also generated, from the recesses 55 and the cracks 56 and 57 formed on the outer layer, in the thickness side thereof. The work 50, on which such scribe line 60 is formed, is removed from the table 3 and the work 50 is then broken along the scribe line 60 by a breaking device or like, not shown.

The work 50 thus broken along the scribe line 60 has a very smooth broken surface because the cracks 56 and 57 extend along the line to be scribed so that the longer crack 56 extends exactly along the scribe line 60 and the recesses 57 are formed not to be continuous and to be separated from each other.

In a preferred embodiment, it is desired that the difference between the angles θα and θβ constituted by the first and second ridgeline lines 21 and 22 and the work surface 50a is in a range of 1° to 10°. In the case of less than 1° or more than 10°, the cracks 56 and 57 will unstably extend.

Further, it is to be noted that, in the above described embodiment, although the scribe line forming method was described in the case of the formation of the straight scribe line 60, the present invention is applicable to form a curved scribe line, and in such case, the feed direction of the cutter is a tangential direction of the curve.

Figure 7:
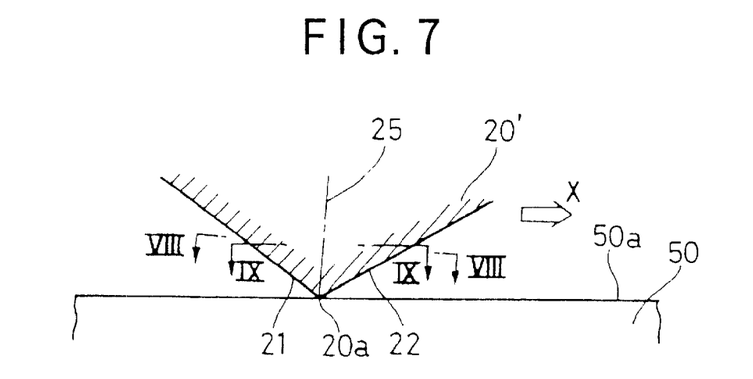
FIG. 7 is an elevational section, in an enlarged scale, of an penetrator made from diamond according to a second embodiment of the present invention.
Figure 8:
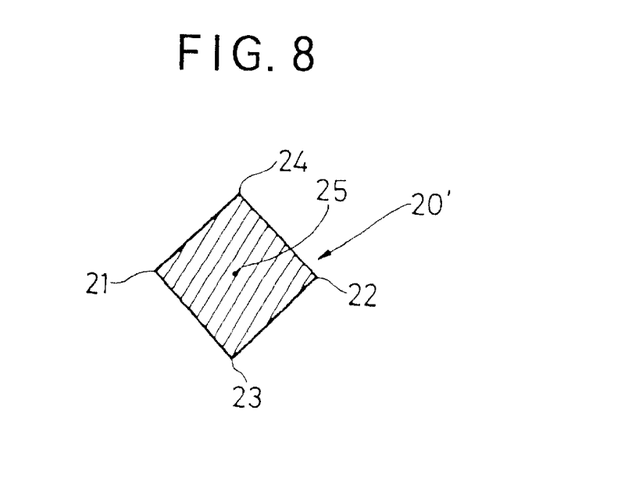
FIG. 8 is a cross sectional view of the diamond penetrator of FIG. 7 taken along the line IIIV—IIIV in a case of being cut in a plane normal to a central axis thereof.
Figure 9:
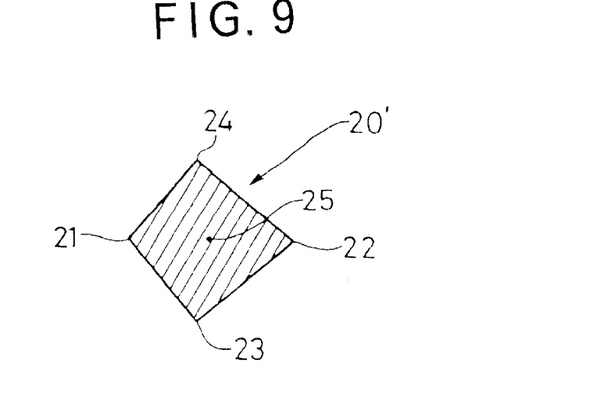
FIG. 9 is a cross sectional view of the diamond penetrator of FIG. 7 taken along the line IX–IX in a case of being cut in a horizontal plane.

That is, according to a second embodiment of the present invention, a diamond penetrator (indenter) 20' having quadrangular pyramid having a square bottom shape (square horizontal sectional shape) may be utilized as shown in FIGS. 7 to 9 in place of the diamond penetrator 20 having no square bottom shape mentioned above.

That is, with reference to FIG. 8, the diamond penetrator 20' has a square section normal to the central axis 25 thereof and angles constituted by the ridgelines 21 and 22 and the central axis 25 are also equal to each other. In a case where a scribe line is formed by using such diamond penetrator 20', the ridgelines 21 and 22 are opposed to each other in the feed direction X and the central axis 25 is inclined towards the feed direction X without making coincident with the normal line of the work surface 50a. According to such arrangement, the ridgelines 21 and 22 take the same positional relationship as that of the diamond penetrator 20 of the former embodiment. FIG. 9 shows a cross sectional shape of the diamond penetrator 20' when the diamond penetrator 20' in such inclined state is cut by a plane parallel to the work surface 50a. Accordingly, when the work surface 50a is pressed by the diamond penetrator 20' in such inclined attitude, recesses and crack having shapes substantially the same as the recesses 55 and cracks 56 and 57 shown in FIG. 5 can be formed on the work surface 50a, thus forming the scribe line 60 as shown in FIG. 6. Further, as can be easily understood from the angular difference of 1° to 10° between the angles θα and θβ, in this embodiment, it will be preferred the angular difference is in a range of 0.5° to 5°.

Figure 10:
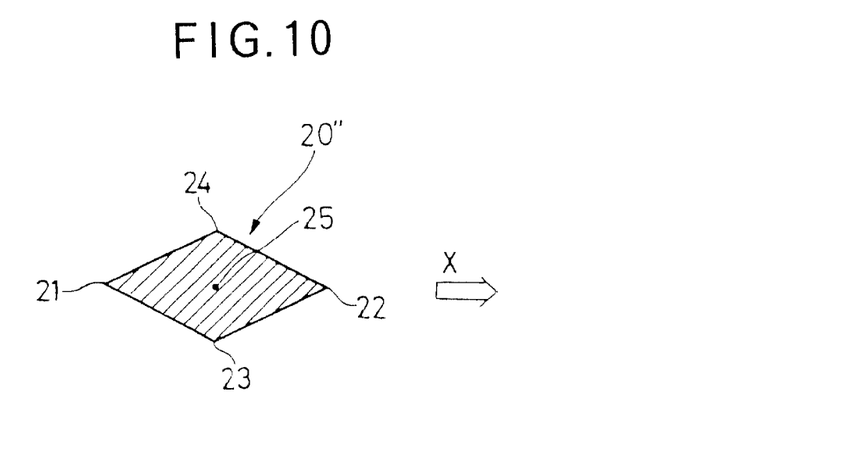
FIG. 10 is a view of a diamond penetrator corresponding to that of FIG. 8, but representing a third embodiment of the present invention.
Figure 11:
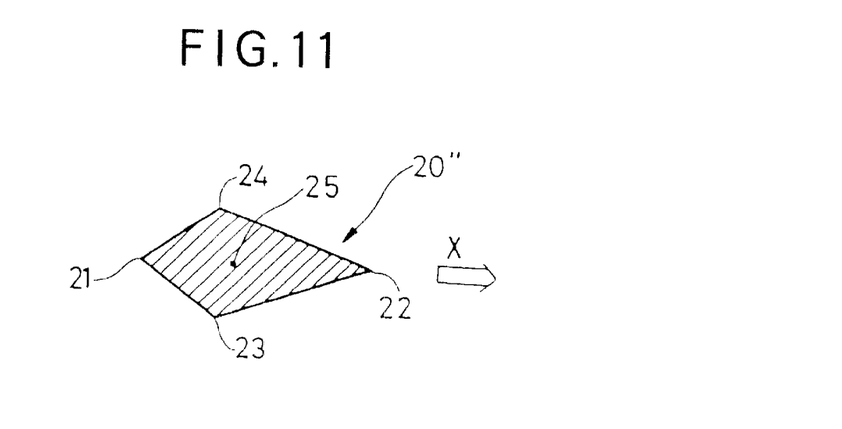
FIG. 11 is a view of a diamond penetrator corresponding to that of FIG. 9, but representing the third embodiment of the present invention.

In a third embodiment as shown in FIG. 10, another diamond penetrator 20' may be utilized, which has a rhombus horizontal cross sectional shape with respect to the central axis 25 of the diamond penetrator 20' as shown in FIG. 10, in which a long axis accords with the feed direction thereof. In the case where the angles constituted by the ridgelines 21 and 22 and the central axis 25 are equal to each other, the ridgelines 21 and 22 are opposed in the feed direction X and the central axis 25 is inclined towards the feed direction X without making coincident with the normal line of the work surface 50a. According to such inclined arrangement, the sectional shape of the diamond penetrator 20' cut by a plane parallel to the work surface 50a will provide the shape shown in FIG. 11, and the angular relationship between the ridgelines 21 and 22 and the work surface 50a is equal to that in the former embodiment.

Figure 12:
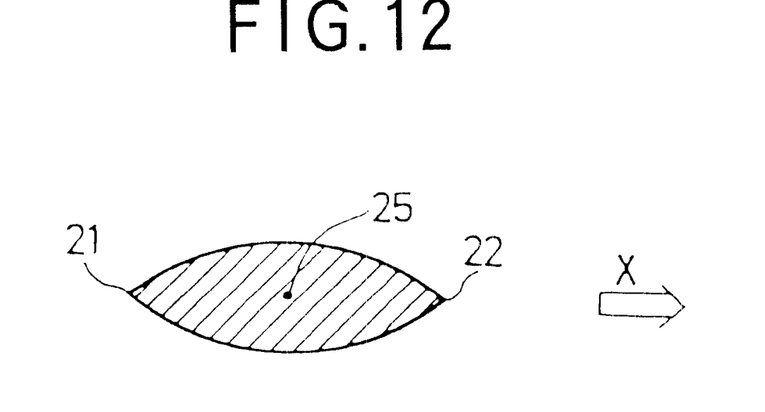
FIG. 12 is a view of a diamond penetrator corresponding to that of FIG. 8, but representing a fourth embodiment of the present invention.

In a fourth embodiment of the present invention shown in FIG. 12, a further diamond penetrator having like an elliptical horizontal cross sectional shape may be utilized in place of that having a quadrangular pyramid shape. That is, in this embodiment, the first and second ridgelines 21 and 22 are formed by crossing two curved surfaces. In a case where the angles constituted by the ridgelines 21 and 22 and the central axis 25 are equal to each other, the ridgelines 21 and 22 are opposed in the feed direction X and the central axis 25 is inclined towards the feed direction X without making coincident with the normal line of the work surface 50a.

Figure 13:
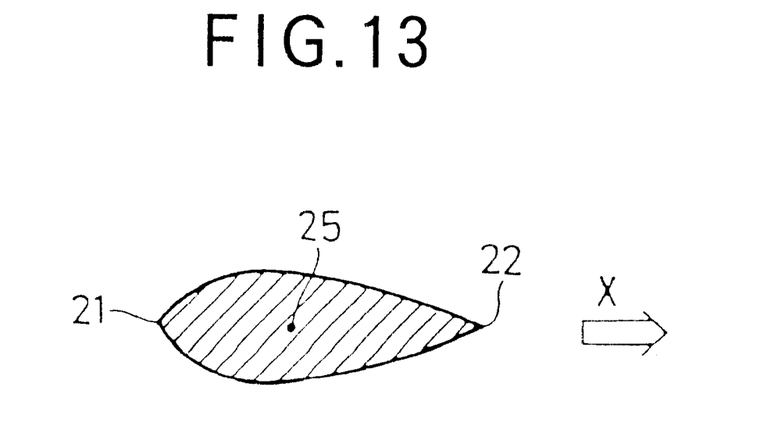
FIG. 13 is a view of a diamond penetrator corresponding to that of FIG. 9, but representing the fourth embodiment of the present invention.

According to such inclined arrangement, the sectional shape of the diamond penetrator cut by a plane parallel to the work surface 50a will provide the shape shown in FIG. 13, and the angular relationship between the ridgelines 21 and 22 and the work surface 50a is equal to that in the former embodiment.

In the embodiment described above, the central axis of the diamond penetrator will be inclined by various methods or ways. That is: in one way, the diamond penetrator is secured so that the central axis 25 may be inclined with respect to the axial line of the base portion 13a of the cutter, in another way, the attachment 19 may be inclined with respect to the central axial line L of the body 11 or like, and in a further way, the central line L may be inclined with respect to the normal line of the work surface 50a.

Further, a material having a hardness higher than that of the work may be utilized as a material for the tip end of the cutter, i.e. abutment member, in place of the diamond penetrator.

Furthermore, the work itself may be moved in place of the scribe body being moved to relatively move the scribe body to the work.

Still furthermore, on the contrary to the above-mentioned embodiments, the angle constituted by the first ridgeline 21 and the work surface may be made smaller than the angle constituted by the second ridgeline 22 and the work surface. In such case, although the scribe line formed is not so fine or smooth in comparison with the scribe line formed by the above-mentioned embodiments, it is possible to obtain a scribe line far preferred in comparison with a scribe line formed by the conventional scribing method.

Furthermore, the recesses are formed so as to be continuous at their angled portions without being formed with space from each other or formed in an overlapped shape. In such case, although the scribe line formed is also not so fine or smooth in comparison with the scribe line formed by the above-mentioned embodiments, it is possible to obtain a scribe line far preferred in comparison with a scribe line formed by the conventional scribing method.

What is claimed is:

1. A method of forming a scribe line on a work surface comprising the steps of preparing a scribing apparatus comprising a scribe body including an abutment member having at least first and second ridgelines and a sharp tip end portion and a vibration generating means for periodically applying vibrations to the abutment member, applying a vibration to the abutment member with the tip end portion thereof abutting against the work surface, and moving the scribe body relative to the work surface in a direction along the work surface to thereby form a scribe line on the work surface, wherein said vibration generating means vibrates the abutment member in a direction crossing the work surface so as to form a plurality of spaced-apart recesses on the work surface by the abutment member, a first angle constituted by the first ridgeline of the abutment member and the work surface and a second angle constituted by the second ridgeline thereof and the work surface are different from each other and the first and second ridgelines are opposed in the moving direction of the scribe body, and cracks are formed from the recesses at portions corresponding to the first and second ridgelines so as to extend in the moving direction of the scribe body, said recesses, and said cracks connecting said recesses, forming said scribe line.

2. A scribing method according to claim 1, wherein said first angle is made larger than said second angle and said second ridgeline is directed to the moving direction of the scribe body and said first ridgeline is directed to a direction opposed to the moving direction of the second ridgeline.

3. A scribing method according to claim 1, wherein said first and second ridgelines have equal angles to each other with respect to a central axis of the tip end portion of the abutment member and said first and second angles of the first and second ridgelines to the work surface are made different by inclining the central axis of the tip end portion towards the moving direction of the scribe body.

4. A scribing method according to claim 1, wherein said first and second angles have a difference in angles in a range of 1° to 10°.

5. A scribing method according to claim 1, wherein the abutment member is pressed against the work surface by the periodical vibrations of the vibration generation means so as to form a plurality of plastically deformed portions on the work surface by the abutment member.

* * * * *